(12) United States Patent
Rolle (10) Patent No.: US 12,299,168 B2
(45) Date of Patent: May 13, 2025

(54) AUTOMATIC GENERATION OF IMPLICIT INFORMATION

(71) Applicant: SAP SE, Walldorf (DE)

(72) Inventor: Benny Rolle, Reinhardshagen (DE)

(73) Assignee: SAP SE, Walldorf (DE)

( * ) Notice: Subject to any disclaimer, the term of this patent is extended or adjusted under 35 U.S.C. 154(b) by 349 days.

(21) Appl. No.: 18/073,142

(22) Filed: Dec. 1, 2022

(65) Prior Publication Data
US 2024/0184913 A1    Jun. 6, 2024

(51) Int. Cl.
| G06F 21/78 | (2013.01) |
| G06F 16/2457 | (2019.01) |
| G06F 21/62 | (2013.01) |
| G06F 21/57 | (2013.01) |

(52) U.S. Cl.
CPC .... *G06F 21/6245* (2013.01); *G06F 16/24575* (2019.01); *G06F 21/6272* (2013.01); *G06F 21/78* (2013.01); *G06F 21/577* (2013.01)

(58) Field of Classification Search
CPC ......... G06F 16/24575; G06F 16/24578; G06F 16/248
USPC .......................................... 709/220, 224–229
See application file for complete search history.

(56) References Cited

U.S. PATENT DOCUMENTS

| 7,308,704 | B2 | 12/2007 | Vogel et al. |
| 7,350,237 | B2 | 3/2008 | Vogel et al. |
| 7,831,567 | B2 | 11/2010 | Luther et al. |
| 8,347,323 | B2* | 1/2013 | Honishi ................... G06F 9/465 709/200 |
| 8,392,116 | B2* | 3/2013 | Lehmann ........... G01C 21/3617 701/481 |
| 8,566,193 | B2 | 10/2013 | Singh et al. |
| 8,782,117 | B2* | 7/2014 | Nachreiner ............. G06F 9/547 709/200 |
| 9,703,813 | B2 | 7/2017 | Hegde et al. |
| 9,904,796 | B2 | 2/2018 | Pluder et al. |
| 10,409,790 | B2 | 9/2019 | Lehnert et al. |
| 10,430,413 | B2 | 10/2019 | Christoph et al. |
| 10,552,642 | B2 | 2/2020 | Rolle et al. |
| 10,754,932 | B2 | 8/2020 | Wiederspohn et al. |
| 10,839,099 | B2 | 11/2020 | Vogel et al. |

(Continued)

OTHER PUBLICATIONS

U.S. Appl. No. 17/186,934, filed Feb. 26, 2021, Rolle et al.

(Continued)

*Primary Examiner* — Khanh Q Dinh
(74) *Attorney, Agent, or Firm* — Fish & Richardson P.C.

(57) ABSTRACT

The present disclosure involves systems, software, and computer implemented methods for automatic generation of implicit information. One example method includes receiving a request for data for a system. Explicitly-stored data stored in the system is identified and added to a data repository used for the request. Function information is identified and stored in a function repository for functions used in the system that accept at least one parameter having a parameter data type and return a return value having a return data type. Implicitly-known data implicitly known by the system is determined by comparing each explicitly-stored data item in the data repository to each identified function included in the function repository. The explicitly-stored data and the implicitly-known data is provided in response to the request.

18 Claims, 8 Drawing Sheets

(56) References Cited

U.S. PATENT DOCUMENTS

| | | | |
|---|---|---|---|
| 10,958,253 B1* | 3/2021 | Cohen | G06N 3/02 |
| 11,042,654 B2 | 6/2021 | Nos et al. | |
| 11,113,417 B2 | 9/2021 | Rolle | |
| 11,126,426 B2* | 9/2021 | Zhu | G06F 8/658 |
| 11,481,228 B2* | 10/2022 | Rangasamy | G06F 9/451 |
| 11,513,779 B2* | 11/2022 | Cimadamore | G06F 12/0223 |
| 11,875,136 B2* | 1/2024 | Araujo Soares | G06F 40/279 |
| 11,941,372 B2* | 3/2024 | Barik | G06F 8/20 |
| 11,967,956 B2* | 4/2024 | Cohen | G06N 10/40 |
| 2014/0188572 A1 | 7/2014 | Hegde et al. | |
| 2016/0019037 A1* | 1/2016 | Varga | G06F 8/443 |
| | | | 717/151 |
| 2017/0103216 A1* | 4/2017 | Ryhorchuk | G06Q 10/00 |
| 2019/0392069 A1* | 12/2019 | Lim | G06F 16/2455 |
| 2020/0019728 A1 | 1/2020 | Rolle | |
| 2020/0285766 A1 | 9/2020 | Jois et al. | |
| 2021/0192052 A1 | 6/2021 | Loch et al. | |
| 2022/0043917 A1 | 2/2022 | Rolle | |
| 2022/0050834 A1 | 2/2022 | Rolle et al. | |
| 2022/0050920 A1 | 2/2022 | Rolle | |
| 2022/0058333 A1 | 2/2022 | Rolle | |
| 2022/0100755 A1 | 3/2022 | Rolle | |
| 2022/0277023 A1 | 9/2022 | Rolle et al. | |

OTHER PUBLICATIONS

U.S. Appl. No. 17/457,797, filed Dec. 6, 2021, Ighoroje et al.
U.S. Appl. No. 17/457,802, filed Dec. 6, 2021, Rolle et al.
U.S. Appl. No. 17/457,811, filed Dec. 6, 2021, Rolle et al.
U.S. Appl. No. 17/457,816, filed Dec. 6, 2021, Vogel et al.
U.S. Appl. No. 17/457,824, filed Dec. 6, 2021, Vogel et al.
U.S. Appl. No. 17/457,827, filed Dec. 6, 2021, Ighoroje et al.
U.S. Appl. No. 17/680,717, filed Feb. 25, 2022, Rolle et al.
U.S. Appl. No. 17/680,741, filed Feb. 25, 2022, Rolle et al.
U.S. Appl. No. 17/680,759, filed Feb. 25, 2022, Rolle et al.
U.S. Appl. No. 17/680,858, filed Feb. 25, 2022, Rolle.
U.S. Appl. No. 17/702,013, filed Mar. 23, 2022, Rolle et al.
U.S. Appl. No. 17/718,770, filed Apr. 12, 2022, Rolle et al.
Wikipedia.org [online], "Data structure" Oct. 2001, retrieved on Dec. 1, 2022, retrieved from URL <https://en.wikipedia.org/wiki/Data_structure>, 5 pages.
Wikipedia.org [online], "Function (computer programming)" Apr. 2003, retrieved on Dec. 1, 2022, retrieved from URL <https://en.wikipedia.org/wiki/Function_(computer_programming)>, 17 pages.
Wikipedia.org [online], "Information privacy" created on May 2003, retrieved on Dec. 6, 2021, retrieved from URL <https://en.wikipedia.org/wiki/Information_privacy>, 7 pages.
Wikipedia.org [online], "Master Data" created on Oct. 2006, retrieved on Dec. 6, 2021, retrieved from URL <https://en.wikipedia.org/wiki/Master_data>, 2 pages.
Wikipedia.org [online], "Personal Data" created on May 2005, retrieved on Dec. 6, 2021, retrieved from URL <https://en.wikipedia.org/wiki/Personal_data>, 7 pages.
Wikipedia.org [online], "Von Neumann architecture" Feb. 2004, retrieved on Dec. 1, 2022, retrieved from URL <https://en.wikipedia.org/wiki/Von_Neumann_architecture>, 11 pages.

* cited by examiner

```
502 — List dataRepository;
504 — List functionRepository;
506 — For (data: dataRepository) {
    508 — For (function: functionRepository) {
        510 — If(data.dataType == function.parameterType) {
            512 — Result = Function.execute(data);
            514 — dataRepository.add(Result);
        }
    }
}
```

FIG. 5

```
602 ─── List dataRepository;
604 ─── List functionRepository;
606 ─── For (data1: dataRepository){
608 ─────── For (data2: dataRepository){
610 ─────────── For (function: functionRepository){
612 ─────────────── If(Set.of(data1.dataType, data2.dataType) ==
                      function.parameterType){
614 ─────────────────── Result = Function.execute(data1, data2);
616 ─────────────────── dataRepository.add(Result);
                    }
                }
            }
        }
```

AUTOMATIC GENERATION OF IMPLICIT INFORMATION

TECHNICAL FIELD

The present disclosure relates to computer-implemented methods, software, and systems for automatic generation of implicit information.

BACKGROUND

Data processing systems can include, for example, Online Analytical Processing (OLAP) systems and Online Transactional Processing (OLTP) systems. OLAP can be used to analyze different data sets to uncover data insights. OLTP systems are transactional systems for handling transactions in turn.

SUMMARY

The present disclosure involves systems, software, and computer implemented methods for automatic generation of implicit information. An example method includes: receiving a request for data for a system; identifying explicitly-stored data stored in the system; adding the explicitly-stored data to a data repository used for the request; identifying function information for functions used in the system that accept at least one parameter having a parameter data type and return a return value having a return data type; storing the identified function information in a function repository used for the request; determining implicitly-known data implicitly known by the system by comparing each explicitly-stored data item in the data repository to each identified function included in the function repository; and providing the explicitly-stored data and the implicitly-known data in response to the request.

Implementations can include one or more of the following features. Determining the implicitly-known data can include, for a given combination of an explicitly-stored data item and a function, determining whether a data type of the explicitly-stored data item matches a data type of a parameter of the function. In response to determining that the data type of the explicitly-stored data item matches the data type of a parameter of the function, the function can be executed using the explicitly-stored data item as an input to the function to generate a function result, the function result can be identified as an implicitly-known data item, and the implicitly-known data item can be added to the data repository for the request. Each implicitly-known data item can be compared to each identified function. A determination can be made as to whether a data type of a first implicitly-known data item matches a data type of a first parameter of a first function. In response to determining that the data type of the first implicitly-known data item matches the data type of the first parameter of the first function, the first function can be executed using the implicitly-known data item as a parameter value for the first parameter to generate a first function result, the first function result can be identified as a second implicitly-known data item, and the second implicitly-known data item can be added to the data repository for the request. The data type of the explicitly-stored data item and the data type of the parameter of the function can be semantic data types. The explicitly-stored data item and the function can each have tags. A determination can be made as to whether a data item tag of a first explicitly-stored data item matches a function tag of a first function. The first function can be executed using the first explicitly-stored data item in response to determining that the data item tag matches the function tag and execution of the first function using the first explicitly-stored data item can be skipped in response to determining that the data item tag does not match the function tag. The explicitly-stored data can be personal data concerning a data subject, the data item tag of the first explicitly-stored data item can indicate a first purpose for which the explicitly-stored data may be processed, the function tag of the first function can also indicate the first purpose, and the first function can be executed in response to determining that the data item tag and the function tag each indicate the first purpose. For a function that includes multiple parameters, determining the implicitly-known data can include: comparing data types of the parameters to data types of different combinations of data items in the data repository; executing the function with a combination of data items as inputs in response to determining that data types of the combination of data items match data types of the multiple parameters; and identifying a function result of the function as an implicitly-known data item. The request can be for personal data concerning a data subject, the identified explicitly-stored data can be explicitly-stored personal data concerning the data subject, and the implicitly-known data can be implicitly known personal data concerning the data subject. An identity of the data subject can be verified before the handling of the request. The explicitly-stored data and the implicitly-known data can be provided to a reviewer before responding to the request. The explicitly-stored data and the implicitly-known data can be used for testing of at least one of the functions in the function repository.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

The processing of personal data is, in most jurisdictions, subject to data protection legislation. Data protection legislation can specify data subject rights, including the right to access certain information. For example, legislation may specify that a data controller must provide certain meta information (e.g., metadata) to a data subject, such as information indicating for which purposes personal data is processed, a data storage period, recipients of the data, etc. Additionally, legislation may specify that the data controller must provide a copy of personal data concerning a data subject in response to a request from the data subject. Accordingly, to comply with requirements of data protection legislation, software products can be configured with a capability to export personal data. Personal data can be defined, for example, as information concerning the data subject. Data protection legislation and/or an interpretation of data protection legislation can include requirements that providing only explicitly-stored data may not be sufficient for complying with the legislation. For example, the legislation or an interpretation of the legislation may specify that implicit information about the data subject that may be generated from the software product should also be returned along with explicitly-stored personal data for the data subject.

As an example, a system may explicitly store a user's data of birth. The system may not explicitly store information that indicates whether a user is of legal age to purchase video games that have an age restriction; however, the system may include function(s) that determine, based on the user's data of birth, whether the user is of legal age to the purchase video games with the age restriction. The system, therefore, is implicitly calculating and using a user's age in system processing, and thus, can determine whether the user is of legal age for video game purchases.

Accordingly, the solution described herein can be used to automatically generate implicit information or knowledge in a software system. In a data protection context, a data controller is thus enabled to use the solution to report comprehensively on processed personal data beyond purely-persisted data, by the solution taking into account implicit data calculated on the fly, for example as done with in-memory systems.

A personal data retrieval system that only exports explicitly-stored information would not capture the system's processing and handling of the user's age. However, the solution described herein can, for example, capture and export implicit information that is generated based on application of an analytical function to stored data. That is, the solution described herein can export implicit information that is actually capable of being generated by a system. In contrast, other solutions, such as machine learning systems, may generate new knowledge or insight for a system that includes information that is not actually capable of being produced by the system. Producing such new knowledge may not be necessary for data protection legislation, for example. Accordingly, the solution described herein can be configured to produce implicit information actually embodied in the system. That is, implicit information exported by the solution for a system or application is information that is revealable by existing capabilities in productive use for the system or application. Knowledge that can only be revealed by external processing (e.g., data analytics, data science, machine learning etc.) which is not in productive use in the system is not revealed.

Although some examples of the solution are described in a context of data protection legal requirements, the solution can also be applied to other contexts or problem domains. For example, implicit information can be exported and stored for various other types of further analysis. As a particular example, an entity may wish to generate and export implicit knowledge for a system, and then store the implicit knowledge as a point in time proof of the system having such knowledge at a given point in time. The entity may want to have such proof before starting collaboration with another entity, for example. Other uses of exported implicit knowledge are possible.

For example, exported implicit knowledge can be used, for example, when an operator of a system might want to view which data is present in different forms in the system. For example, there might be a set of data which is not sensitive. Then, the non-sensitive data is calculated to an interim results which is sensitive. The interim result may then be further processed, to a non-sensitive form. The system operator could use the solution described herein to find out how sensitive all implicit data is.

For instance, suppose an application takes as input some information about a person (e.g., date of birth, address, citizenship, past insurance cases, occupation etc.) and then uses this data as input into a function that calculates the probability that the person dies within the next 10 years (where the probability is sensitive information). However, the only information presented to the user by the application might be prompts such as "you are accepted for an offer life insurance" or "we cannot offer life insurance at this time". The system operator might use a test system, put test data into the system, and apply the implicit data export solution described herein. The operator can use the solution to discover that the system has in its main memory information about the probability whether a person dies within the next 10 years. The operator might therefore apply certain security measures, to appropriately protect sensitive data stored in memory in the system.

In other examples, implicit knowledge may be used for data analytics. For instance, patterns may be found in the set of all knowledge that includes implicit knowledge that are not obvious or included in only a set of explicit knowledge. For example, suppose there is a function "ageAtPurchase" with "dateOfBirth" and "purchaseDate" as input parameters. Implicit knowledge can indicate that there is a pattern that 25-year-old customers prefer to buy a certain genre of video games whereas 45-year-old customers prefer to buy a certain genre of movies. The information found out by such data analytics of implicit knowledge can then be used, for example, by recommender systems that recommend to customers items they might be interested in. Such data analytics can be performed without a data scientist performing other work or analysis on raw data, for example. Additionally, data scientists may not think to analyze raw data in certain ways.

As another example, implicit knowledge may be useful to identify bugs in a software application. For example, in a test system, a test customer might be created with a certain date of birth. Then, all implicit knowledge might be created, and a tester might check the available information on the implicit knowledge. For example, a test user may be created with date of birth 1st of January 1980, and the implicit knowledge shows "hasLegalAge"=false. The tester might report this as a potential bug to the developers of the application. In another scenario, a real customer who is of a legal age might not be able to order an age-restricted video game and he reports this situation to the company. The company can then create all implicit knowledge and they may find out that a hasLegalAge function is always set to false for test situations involving a test customer created based on the real customer. Accordingly, the company is able to identify a certain bug within the software that was not found during other testing. For example, perhaps the customer was born on the 29th of February or he has configured a personal device with an uncommon calendar such as "Thai Buddhist calendar" and instead of a date of birth expected by the software application, the software application received unexpected data, e.g., as a situation that developers may not have thought to test. If a support developer exports implicit knowledge as part of testing, such mistakes can be identified. As another example, implicit knowledge can be exported by a software application and then compared with other knowledge (e.g., of real customer data, or test data) to find anomalies. For example, a user reports that a certain feature does not work, then it might be found automatically that according to the records, the user's age is off by 543 years (because his personal device uses the Thai Buddhist calendar and a mistranslation to a Gregorian date occurred), which was not considered properly by the server, and this might be detected automatically as an anomaly. This might help the development team in a more privacy-preserving way to find anomalies (because no human will see all personal data of the customer).

Other examples are possible. For instance, in some cases, the operator of the system may use implicit data along with explicit data to investigate unusual activity to determine, for example, whether a hacker has access to the system.

Figure 1:
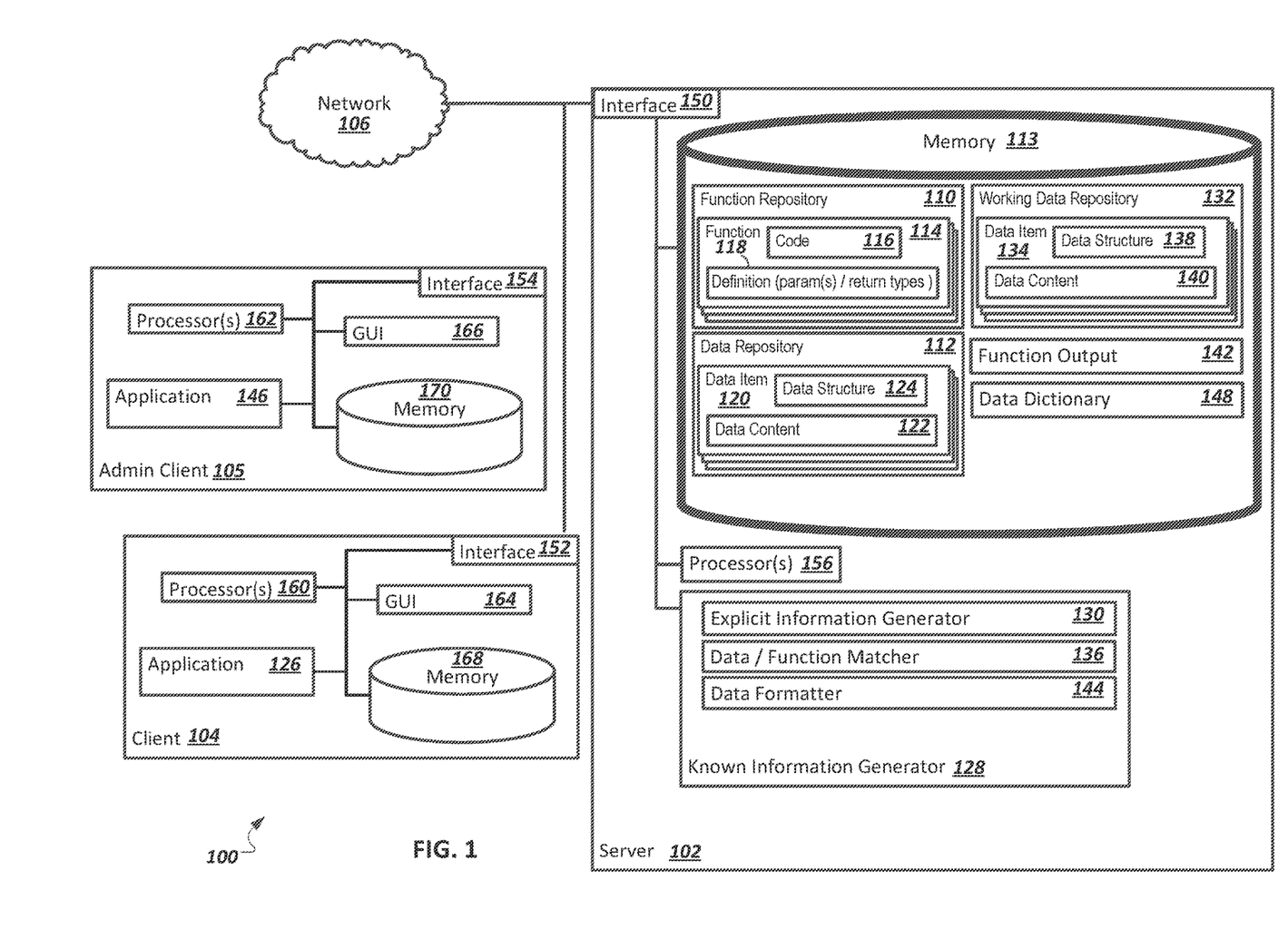
FIG. 1 is a block diagram illustrating an example system for automatic generation of implicit information.

FIG. 1 is a block diagram illustrating an example system 100 for automatic generation of implicit information. Specifically, the illustrated system 100 includes or is communicably coupled with a server 102, an end-user client device 104, an administrator client device 105, and a network 106. Although shown separately, in some implementations, functionality of two or more systems or servers may be provided by a single system or server. In some implementations, the functionality of one illustrated system, server, or component may be provided by multiple systems, servers, or components, respectively.

The server 102 can be or represent a system that includes data and functions. For example, the server 102 can include a function repository 110 and a data repository 112 in memory 113. The function repository 110 can include information specifying how each function is defined and implemented. For example, the function repository 110 can include a set of functions, such as a function 114. Each function 114 can include code 116 (e.g., a function implementation) and a function definition 118 (e.g., a definition of function parameter(s), including a data type for each parameter, and a function return data type). Functions 114 included in the function repository 110 can be granular functions that serve a single purpose (e.g., accept one or more parameters and produce a single output).

The data repository 112 can include a set of data items, including a data item 120. Each data item 120 can include data content 122 of the data item 120 and a data structure definition 124 for the data item 120. A data structure definition 124 can be a class definition or other type of data structure definition. A given data item 120 can be considered to be an instance of the data structure defined by the data structure definition 124 of the data item 120. In some cases, a data structure definition 124 may specify that a corresponding data item 120 is of an "unstructured" data type. If the server 102 includes implementation of machine learning (ML) algorithms, a given ML algorithm can be considered to be a function that may produce an output, and the ML algorithm can be represented in the function repository 110 as a function 114 in a manner similar to other non-ML functions.

The server 102 can receive a request to provide information regarding data that is known, either explicitly or implicitly, by the server 102. For example, a user of the end-user client device 104 can use an application 126 to submit a request to the server 102 for personal data that the server 102 knows about the user. A known information generator 128 can be configured to generate known information in response to the request. For a personal data request, the known information generator 128 can identify, for example, explicitly-stored personal information and also implicitly-known personal information, for a user (e.g., data subject) associated with the request.

An explicit information generator 130 can identify explicit information associated with the request, such as explicit information stored by the server 102 in the data repository 112 for a data subject of a personal data request. The explicit information identified by the explicit information generator 130 can be used to initialize a working data repository 132. The working data repository 132 initially includes, as data items 134, copies of or references to data items 120 that relate to the request (e.g., that concern the data subject).

To identify implicitly-known information to include in a response to the request along with explicitly-stored information, a data/function matcher 136 can compare data in the working data repository 132 to the functions in the function repository 110. For example, the data/function matcher 136 can process each combination of a data item 134 and a function 114. For example, for a given data item 134 and given function 114, the data/function matcher 136 can determine if a data type of the data item 134 as defined in a data structure definition 138 matches an input parameter type of the function 114 as defined in the function definition 118. If the data type of the data item 134 matches the input parameter type of the function 114, the data/function matcher 136 (or another component) can execute the code 116 of the function 114 using data content 140 of the data item 134 as an input to the function 114 to generate a function output 142. The function output 142 can be added as an additional data item 134 to the working data repository 132. The data/function matcher 136 can, in turn, process a combination of the given data item 134 and a next function 114 in the function repository 110. The data/function matcher 136 can then process other data items 134 in a similar manner, including any additional data items 134 that have been added based on a calculated function output 142, for example.

After the data/function matcher 136 has processed all combinations of data items 134 and functions 114, the working data repository 132 includes a combination of both explicitly-stored data relating to the request and implicitly-known data relating to the explicitly-stored data. Accordingly, the server 102 can provide a copy of the working data repository 132 to the user, such as for presentation in the application 126 on the end-user client device 104. In some implementations, a data formatter 144 may format the copy of the working data repository 132 into a desired human-readable format before the copy of the working data repository 132 is provided in response to the request. In some implementations, an administrator may use an administrative application 146 to review the copy of the working data repository 132 before information is provided in response to the request. For example, the administrator may identify and remove certain information, such as data concerning another data subject other than the requestor, trade secret information, or other information, before a response is provided.

In some implementations, the parameters and/or return type of some or all functions 114 are semantic data types rather raw data types (e.g., integer). Semantic types can be defined in a data dictionary 148, for example. For instance, the data dictionary 148 can define semantic types that represent semantic concepts such as age, house number, gender, or customer status, to name a few examples. When semantic types are used, the data/function matcher 136 can compare a semantic type of a data item 134 to a semantic type of a parameter of a function 114, and only call the function 114 using the data item 134 as input when the semantic type of the data item 134 matches the semantic type of the parameter of the function 114. Matching on semantic types can result in more meaningful results than matching on raw data types. In some systems, substantially all data used by applications is defined by developers as semantic types, so that human-readable text can be displayed on user interfaces, for example. In such systems, semantic-type matching can result in particularly meaningful matches. In systems in which raw or generic types are used for some data items, a raw or generic type can be transformed into a semantic type (e.g., manually), when the solution is applied, to improve the preciseness.

The known information generator 128 can use different types of approaches in some implementations. For example, for a personal data request for a data subject, rather than first filtering the data repository 112 to extract information stored for the data subject, and then processing combinations of filtered data (e.g., the initial working data repository 132) and the functions in the function repository 110, the data/function matcher 136 can perform preprocessing by determining combinations of different data subsets (e.g., of different data subjects) and functions and then filter those pre-processed combinations by a requesting data subject in response to a request. As another example, in some implementations, the known information generator 128 can use static taint analysis to determine, for example, which data theoretically flows into which function.

As used in the present disclosure, the term "computer" is intended to encompass any suitable processing device. For example, although FIG. 1 illustrates a single server 102, a single end-user client device 104, and a single administrator client device 105, the system 100 can be implemented using a single, stand-alone computing device, two or more servers 102, or multiple client devices. Indeed, the server 102 and the client devices 104 and 105 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client devices 104 and 105 may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 150, 152, and 154 are used by the server 102, the end-user client device 104, and the administrator client device 105, respectively, for communicating with other systems in a distributed environment—including within the system 100—connected to the network 106. Generally, the interfaces 150, 152, and 154 each comprise logic encoded in software and/or hardware in a suitable combination and operable to communicate with the network 106. More specifically, the interfaces 150, 152, and 154 may each comprise software supporting one or more communication protocols associated with communications such that the network 106 or interface's hardware is operable to communicate physical signals within and outside of the illustrated system 100.

The server 102 includes one or more processors 156. Each processor 156 may be a central processing unit (CPU), a blade, an application specific integrated circuit (ASIC), a field-programmable gate array (FPGA), or another suitable component. Generally, each processor 156 executes instructions and manipulates data to perform the operations of the server 102. Specifically, each processor 156 executes the functionality required to receive and respond to requests from the end-user client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including ABAP (Advanced Business Application Programming, ABAP OO (Object Oriented), C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes the memory 113. In some implementations, the server 102 includes multiple memories. The memory 113 may include any type of memory or database module and may take the form of volatile and/or non-volatile memory including, without limitation, magnetic media, optical media, random access memory (RAM), read-only memory (ROM), removable media, or any other suitable local or remote memory component. The memory 113 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102. As mentioned, the memory 113 includes the function repository 110 and the data repository 112.

The end-user client device 104 and the administrator client device 105 may each generally be any computing device operable to connect to or communicate with the server 102 via the network 106 using a wireline or wireless connection. In general, the end-user client device 104 and the administrator client device 105 each comprise an electronic computer device operable to receive, transmit, process, and store any appropriate data associated with the system 100 of FIG. 1. The end-user client device 104 and the administrator client device 105 can each include one or more client applications, including the application 126 or the administrative application 146, respectively. A client application is any type of application that allows the end-user client device 104 or the administrator client device 105 to request and view content on a respective client device. In some implementations, a client application can use parameters, metadata, and other information received at launch to access a particular set of data from the server 102. In some instances, a client application may be an agent or client-side version of the one or more enterprise applications running on an enterprise server (not shown).

The client device 104 and the administrator client device 105 respectively include processor(s) 160 or processor(s) 162. Each processor 160 or 162 included in the end-user client device 104 or the administrator client device 105 may be a central processing unit (CPU), an application specific integrated circuit (ASIC), a field-programmable gate array (FPGA), or another suitable component. Generally, each processor 160 or 162 included in the end-user client device 104 or the administrator client device 105 executes instructions and manipulates data to perform the operations of the end-user client device 104 or the administrator client device 105, respectively. Specifically, each processor 160 or 162 included in the end-user client device 104 or the administrator client device 105 executes the functionality required to send requests to the server 102 and to receive and process responses from the server 102.

The end-user client device 104 and the administrator client device 105 are each generally intended to encompass any client computing device such as a laptop/notebook computer, wireless data port, smart phone, personal data assistant (PDA), tablet computing device, one or more processors within these devices, or any other suitable processing device. For example, the end-user client device 104 and/or the administrator client device 105 may comprise a computer that includes an input device, such as a keypad, touch screen, or other device that can accept user information, and an output device that conveys information associated with the operation of the server 102, or the respective client device itself, including digital data, visual information, or the GUI 164 or a GUI 166, respectively.

The GUIs 164 and 166 interface with at least a portion of the system 100 for any suitable purpose, including generating a visual representation of the application 126 or the administrative application 146, respectively. In particular, the GUI 164 and/or the GUI 166 may be used to view and navigate various Web pages. Generally, the GUI 164 and the GUI 166 provide a respective user with an efficient and user-friendly presentation of business data provided by or communicated within the system. The GUI 164 and the GUI 166 may each comprise a plurality of customizable frames or views having interactive fields, pull-down lists, and buttons operated by the user. The GUI 164 and the GUI 166 each contemplate any suitable graphical user interface, such as a combination of a generic web browser, intelligent engine, and command line interface (CLI) that processes information and efficiently presents the results to the user visually.

Memory 168 and memory 170 included in the end-user client device 104 or the administrator client device 105, respectively, may each include any memory or database module and may take the form of volatile or non-volatile memory including, without limitation, magnetic media, optical media, random access memory (RAM), read-only memory (ROM), removable media, or any other suitable local or remote memory component. The memory 168 and the memory 170 may each store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the associated client device.

There may be any number of end-user client devices 104 and/or administrator client devices 105 associated with, or external to, the system 100. For example, while the illustrated system 100 includes one end-user client device 104, alternative implementations of the system 100 may include multiple end-user client devices 104 communicably coupled to the server 102 and/or the network 106, or any other number suitable to the purposes of the system 100. Additionally, there may also be one or more additional end-user client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the end-user client device 104 and the administrator client device 105 may be described in terms of being used by a single user, this disclosure contemplates that many users may use one computer, or that one user may use multiple computers.

Figure 2:
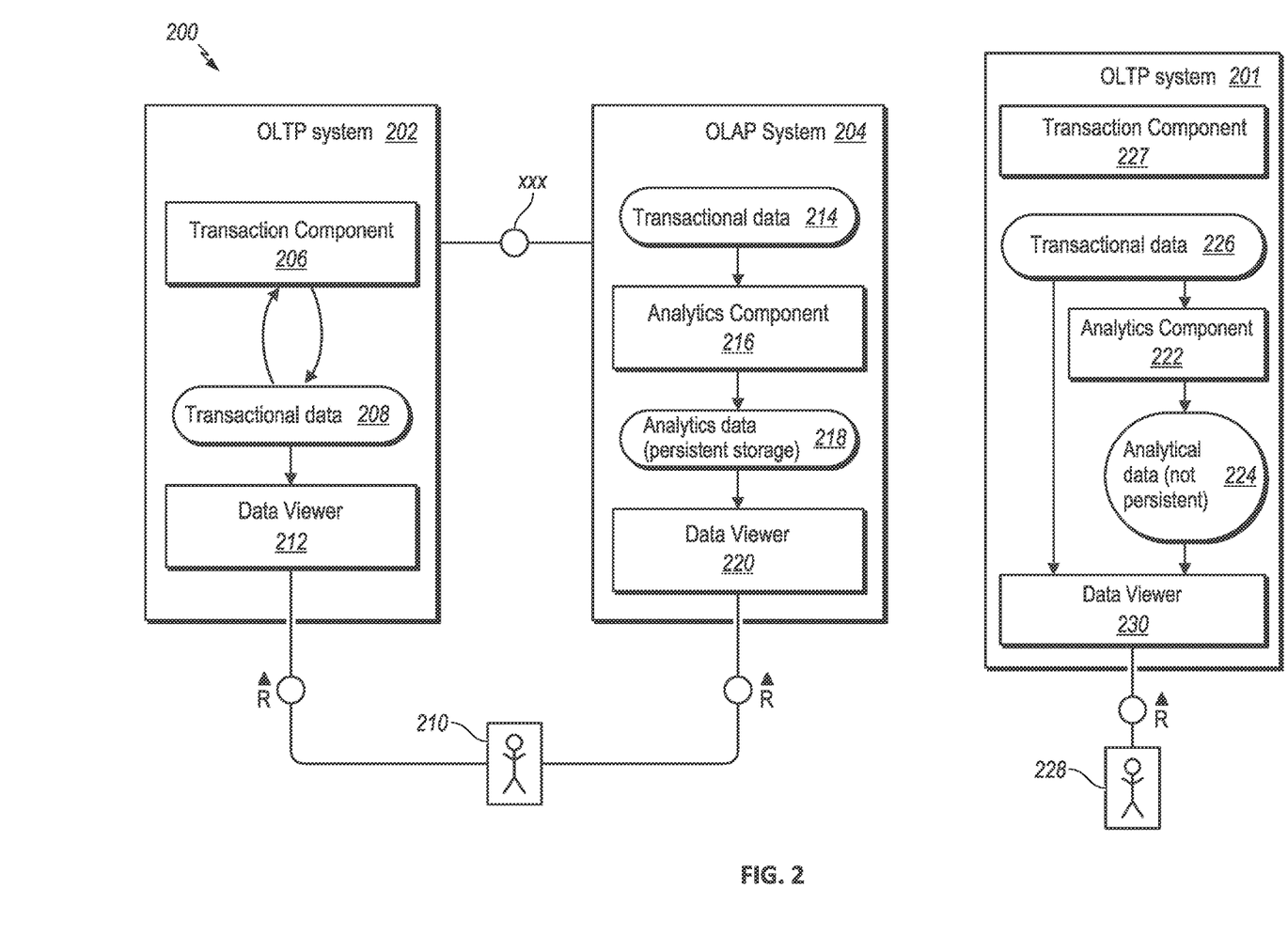
FIG. 2 is a diagram that illustrates OLTP, OLAP, and in-memory database systems as used in one example of the present solution.

FIG. 2 is a diagram 200 that illustrates OLTP, OLAP, and in-memory database systems. Before using an in-memory database system, such as in-memory database system 201, an enterprise may have used both an OLTP system 202 and an OLAP system 204. The OLTP system 202 is a transactional system for processing data transactions. For example, a transaction component 206 can process transactional data 208, such as handling a transaction of a customer placing an order. A user 210 may be able to view transactional data using a data viewer 212, for example. The OLTP system 202 can be configured to extract personal data for a data subject from the stored transactional data 208.

The OLAP system 204 is an analytical system that can store transactional data 214 as a copy of the transactional data 208 received from the OLTP system 202. An analytics component 216 can analyze the transactional data 214 to produce analytical data 218. For example, the analytical data 218 can include insight information that indicates which days of week respective customers are most likely to place an order, for example. The analytical data 218 is stored in persistent storage of the OLAP system 204. The user 210 (or another user) can view the analytical data 218 using a data viewer 220. The OLAP system 204 can be configured to extract personal data for a data subject from the stored analytical data 218. That is, by sending requests to both the OLTP system 202 and the OLAP system 204, personal data can be retrieved for a data subject that is either included in the transactional data 208 or in analytical data 218 that is generated from the transactional data 208.

With the in-memory database system 201, however, an analytics component 222 may be configured to dynamically generate and provide analytical data 224 on the fly in response to requests, such that the analytical data 224 is not stored persistently. For example, the analytics component 222 can dynamically generate information that indicates which days of week respective customers are most likely to place an order. Accordingly, while personal data can be retrieved from stored transactional data 226 (e.g., where the transactional data 226 is generated by a transaction component 227) in response to a request from a data subject, the analytical data 224 can't simply be retrieved from storage in response to the request. However, the techniques described herein can be used to automatically generate a subset of the analytical data 224 that relates to the data subject. A user 228 can view transactional data 226 that relates to a data subject and/or the subset of analytical data 224 that relates to the data subject using a data viewer 230.

Figure 3:
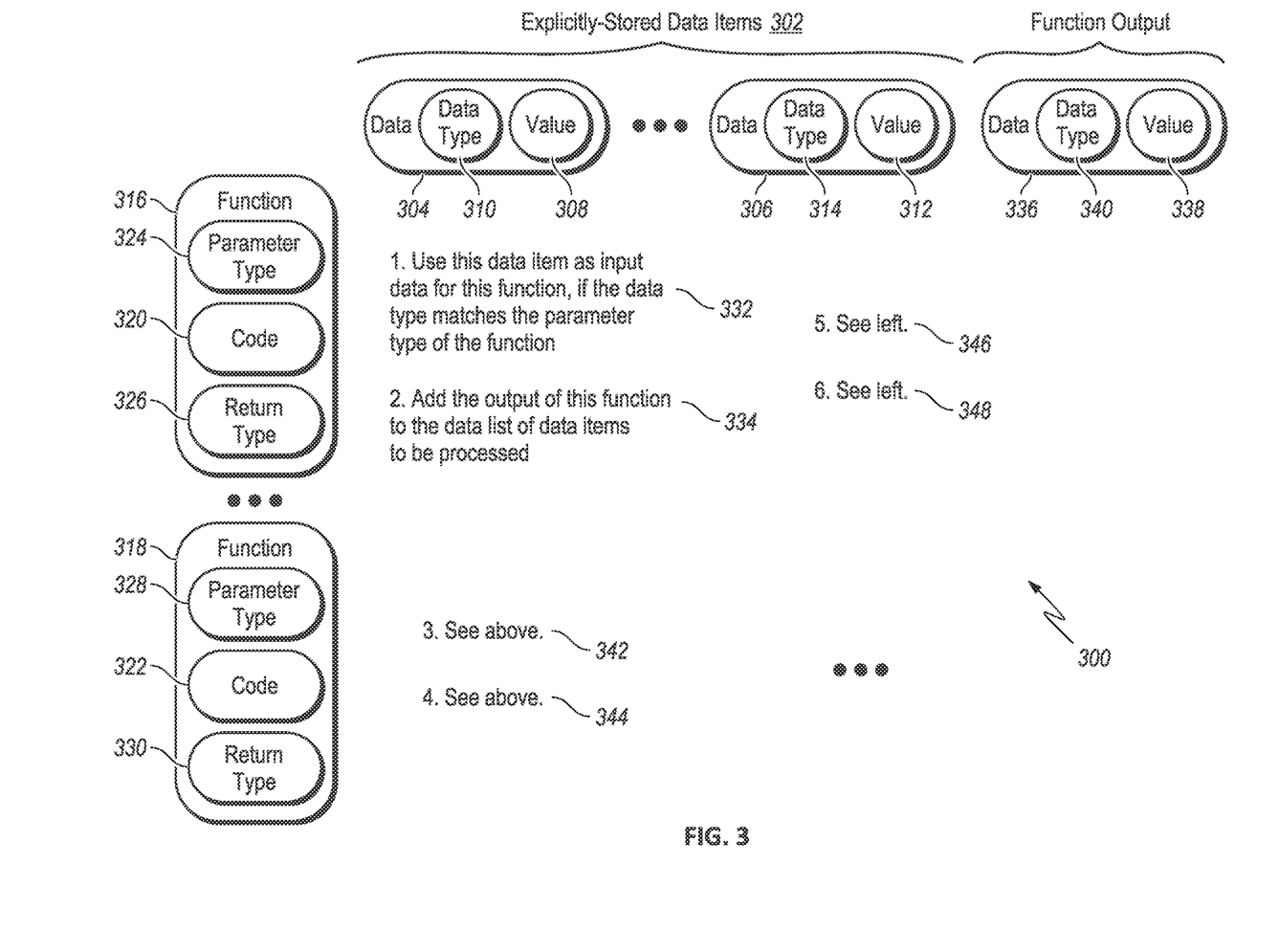
FIG. 3 illustrates an example table representing a determination of implicitly-known information.

FIG. 3 illustrates an example table 300 that represents determination of implicitly-known information. The table 300 includes, as columns, data items to be processed. The table 300 can include initial columns 302 that include data items relating to a request that are explicitly stored by a system receiving the request. For example, the initial columns 302 can include data items 304 and 306 that relate to a data subject who has submitted or is otherwise associated with a personal data request. The data items 304 and 306 include a data value 308 of a data type 310 or a data value 312 of a data type 314, respectively. The table 300 can initially include other columns corresponding to other explicitly-stored data items.

Each data item of a respective column in the table 300 can be processed along with each row in the table 300, where each row corresponds to a given function in a function repository. For example, the table 300 includes a function 316 and a function 318 as respective rows in the table 300. The functions 316 and 318 include code implementations 320 or 322, respectively. Additionally, the functions 316 and 318 include function definitions that specify a parameter type 324 and return type 326 or a parameter type 328 and return type 330, respectively. The table 300 can include other rows representing other functions.

As described in note 332, the data item 304 can be provided as input data to the function 316 if the data type 310 of the data item 304 matches the parameter type 324 of the function 316. That is, the code 320 can be executed using the data item 304 as an input parameter if the data type 310 matches the parameter type 324. As described in note 334, if the function 316 is invoked with the data item 304 as an input, an output of the function 316 can be added to the data list of data items to be processed. For example, a data item 336 (with a data value 338 matching the function output and a data type 340 matching the return type 326) can be added as a next column in the table 300. The data item 336 can be later processed in a manner similar to other columns.

As indicated by note 342, the data item 304 can be processed with the function 318 in a similar manner as for the function 316. That is, the data item 304 can be provided as input data to the function 318 if the data type 310 of the data item 304 matches the parameter type 328 of the function 316. As indicated by note 344, the function output of the function 318 can be handled in a similar manner as described by the note 334. That is, if the function 318 is invoked with the data item 304 as an input, an output of the function 318 can be added to the data list of data items to be processed (e.g., as a next column). After the data item 304 has been processed for every function (e.g., every row of the table 300), the data item 306 can be similarly processed for each function (e.g., as indicated by notes 346 and 348). Other data columns that represent explicitly-stored information can be similarly processed. Additionally, if new columns have been added to the table 300 that correspond to a function output (e.g., the data item 336), each data item of each new column can be processed for each function. After all columns have been processed, the collection of data items from all columns can represent a combination of explicitly and implicitly-known data in the system. The collection of data items includes both persisted information and information that can be revealed by the system by invoking a function of the system using persisted information, for example. Accordingly, the combination of explicitly- and implicitly-known data can be provided in response to a request.

Figure 4:
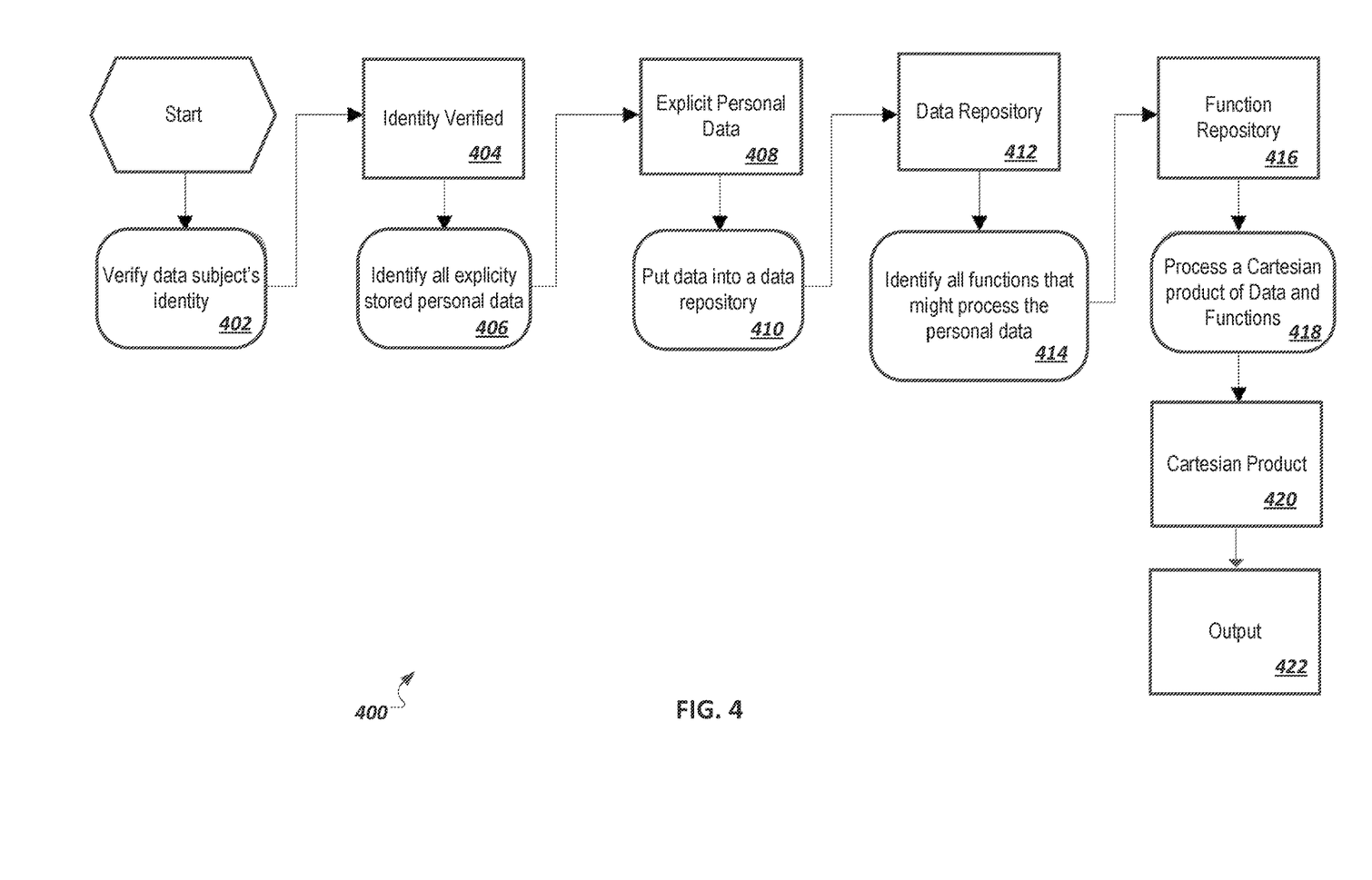
FIG. 4 is a flowchart of an example method for automatic generation of implicit information.

FIG. 4 is a flowchart of an example method 400 for automatic generation of implicit information. At 402, identify of a data subject is verified, such as in response to a request received from a data subject for personal information regarding the data subject. Different approaches can be used to verify the identity of the data subject. A result of identity-verified 404 can be obtained from the data subject identification process.

At 406, explicitly-stored personal data 408 for the data subject is identified. Various types of approaches can be used to identify explicitly-stored personal data for a data subject. For example, data that includes or is associated with an identifier of the data subject can be identified and retrieved. A given system or application may have existing capabilities to identify explicit personal information, for example.

At 410, the explicitly-stored personal data 408 is placed into a data repository 412. The data repository can be a working data storage area used by further processing described below.

At 414, all functions that might process the explicit personal data 408 are identified and function information for the identified functions is placed into a function repository 416.

At 418, a Cartesian product 420 of the data in the data repository 412 and the function information in the function repository 416 is processed. The Cartesian product 420, which can include combinations of functions and data items, can be processed as described above with respect to FIG. 3 and as described below with respect to FIGS. 5 and 6. In general, a Cartesian product of two sets of items is a set of pairs of items from the two sets.

An output 422 of processing the Cartesian product 420 can be provided to the data subject in response to the request. The output 422 can include a combination of explicit and implicit personal information for the data subject, for example.

Figure 5:
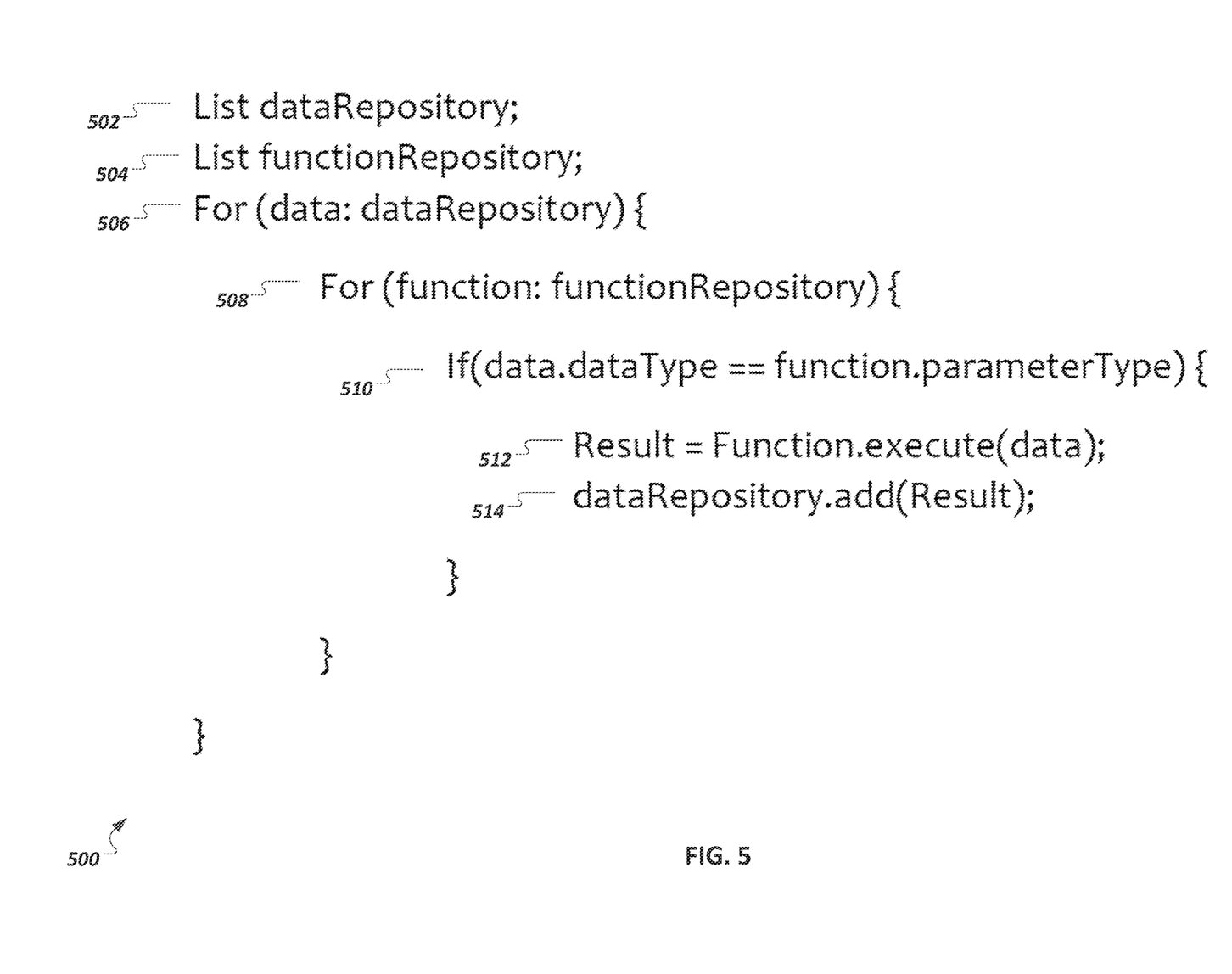
FIG. 5 illustrates example code for determination of implicitly-known information.

FIG. 5 illustrates example code 500 for determination of implicitly-known information. A statement 502 introduces a dataRepository variable that refers to a data repository that has been initialized to include explicitly-stored information (e.g., the data repository can include a copy of data that a system explicitly stores for a data subject). A statement 504 introduces a functionRepository variable that refers to a repository of functions that are used in a system.

A first iteration statement 506 can be executed to iterate over each data item in the data repository. A second iteration statement 508 can be executed to iterate over each function in the function repository. Through use of the first iteration statement 506 and the second iteration statement 508, a test 510 can be performed for each pair of a data item and function.

The test 510 can be used to determine whether the data type of the data item matches the parameter type of the input parameter of the function (FIG. 6 below includes code that can be used if the function has multiple parameters). If the data type of the data item matches the parameter type of the input parameter of the function, statements 512 and 514 are executed. Statement 512 can be executed to generate a result of invoking the function with the data item as an input parameter. Statement 514 can be executed to add the output result of the function execution to the data repository. Accordingly, the output result from the function execution can be processed in a later iteration of the first iteration statement 506 (e.g., in a same manner as performed for an explicitly-stored data item).

Figure 6:
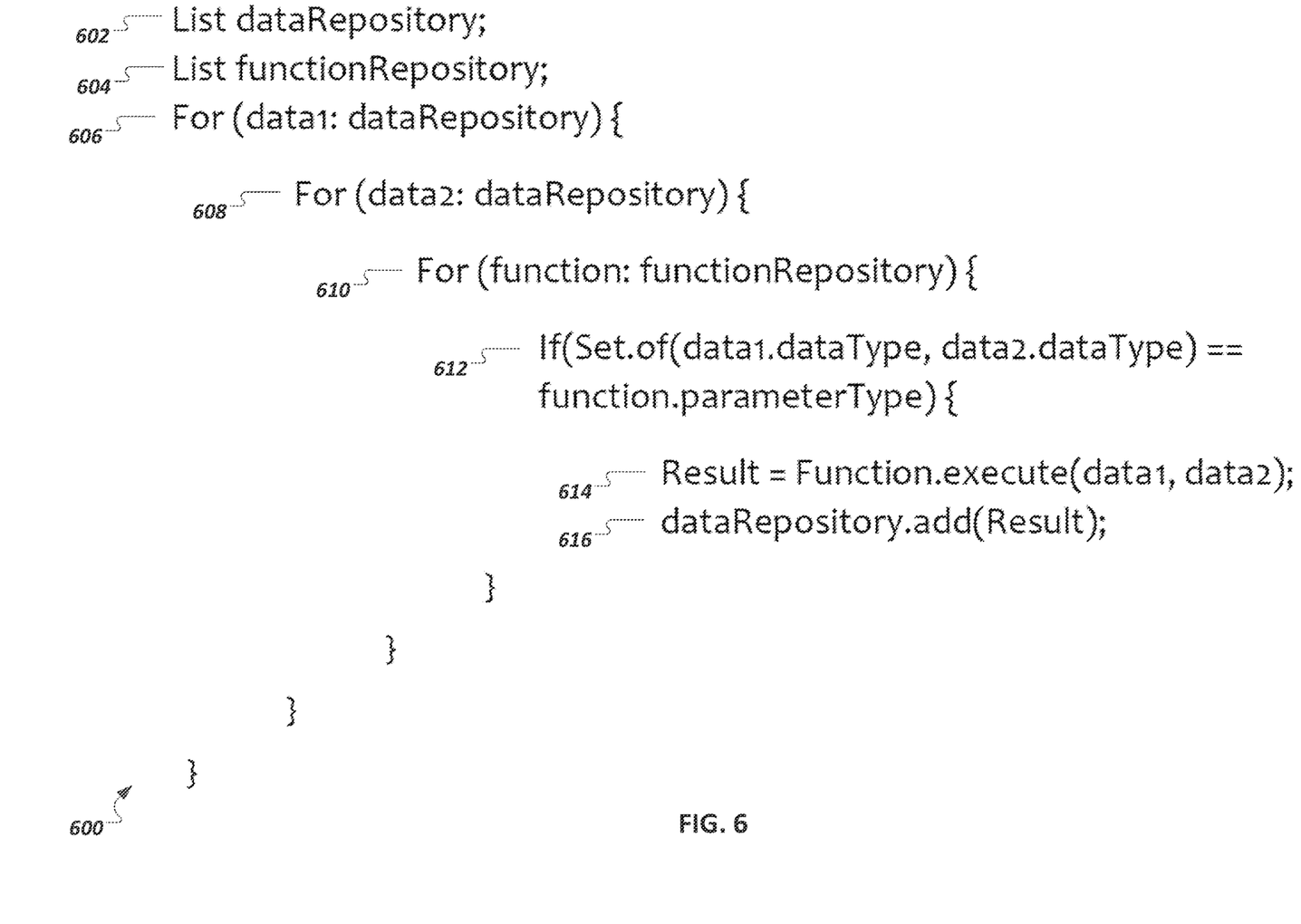
FIG. 6 illustrates example code determination of implicitly-known information for functions that have multiple parameters.

FIG. 6 illustrates example code 600 for determination of implicitly-known information for functions that have multiple parameters. A statement 602 introduces a dataRepository variable that refers to a data repository that has been initialized to include explicitly-stored information (e.g., the data repository can include a copy of data that a system explicitly stores for a data subject). A statement 604 introduces a functionRepository variable that refers to a repository of functions that are used in a system.

A first iteration statement 606 can be executed to iterate over each data item in the data repository and store a reference to a current data item in a "data1" variable. A second iteration statement 608 can be executed to iterate over each data item in the data repository and store a reference to a current data item in a "data2" variable. Use of the first iteration statement 606 and the second iteration statement 608 can enable processing of each pair of data items, for example. A third iteration statement 610 can be executed to iterate over each function in the function repository.

Through use of the first iteration statement 606, the second iteration statement 608, and the third iteration statement 610, a test 612 can be performed for combination of a function and a data1/data2 data item pair. The test 612 can be used to determine whether the data types of the two data items match the data types of the input parameters of the function.

If the data types of the two data items match the data types of the input parameters of the function, statements 614 and 616 are executed. Statement 614 can be executed to generate a result of invoking the function with the two data items as input parameters. Statement 616 can be executed to add the output result of the function execution to the data repository. Accordingly, the output result from the function execution can be processed in a later iteration (e.g., in a same manner as performed for explicitly-stored data items). Similar approaches can be used for functions that include more than two input parameters.

Figure 7:
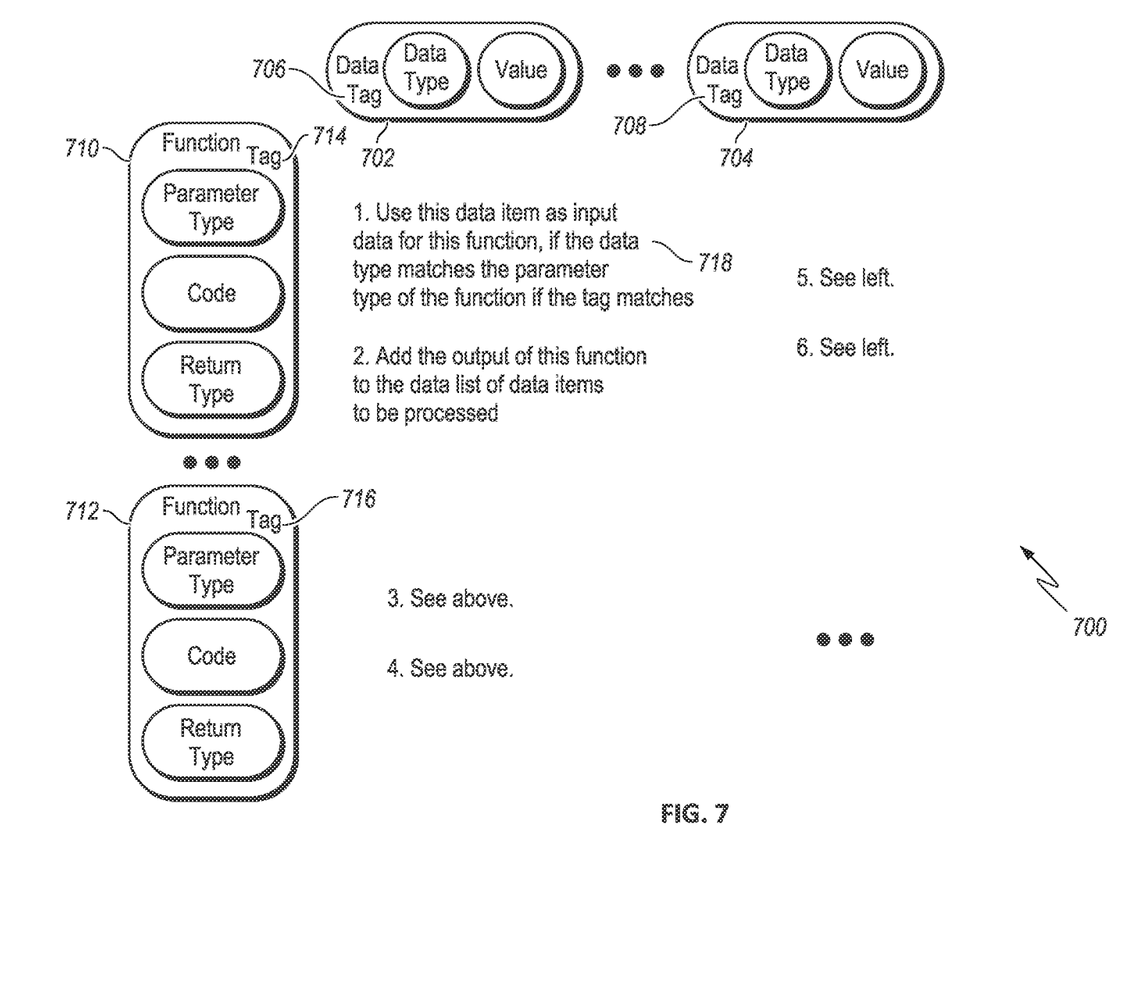
FIG. 7 illustrates an example table that represents determination of implicitly-known information using tags.

FIG. 7 illustrates a table 700 that represents determination of implicitly-known information using tags. The table 700 is similar to the table 300 described above with respect to FIG. 3, in that the table 300 has data items as columns and functions as rows. However, each data item and each function as shown in FIG. 7 can have a tag. For example, data items 702 and 704 have a tag 706 or 708 and functions 710 and 712 have a tag 714 or 716, respectively.

Tags may represent a semantic meaning or purpose of the data item or function. For example, functions and/or data items may be tagged with a tag that represents use of the function or data item with respect to a role of a user or data subject. For example, tags might be "employee," "customer," "business partner," "newsletter recipient," "board member," etc. The processing of the table 700 can be similar to the processing of the table 300 described below, except for some additional handling of tags. For instance and as described in a note 718, the data item 702 can be provided as an input to the function 710 if the data type of the data item 702 matches the parameter type of the function 710 and if the tag 706 of the data item 702 matches the tag 714 of the function 710.

For example, the function 714 may be a function to calculate a number of weeks of granted vacation time given a birth date of an employee. The tag 714 of the function 710 may be "employee". The data item 702 may represent a birth date of a particular employee and the tag 706 may also be "employee". Based on the tag 706 matching the tag 714, the data item 702 can be provided as an input to the function 710. The data item 704, as another example, may correspond to a birth date of a customer and the tag 708 may be "customer". Since the tag 708 does not match the tag 714, the data item 704 is not provided as an input to the function 710, e.g., since calculating a number of weeks of granted vacation time does not make sense for a customer.

In some cases, tags for data items may correspond to a data protection purpose of the data item. Data protection tags may be used to implement data protection so that personal data is only processed for a certain purpose. For example, personal data may be tagged with indicators of allowed purposes and functions are also tagged with a purpose designator. The system that uses such tagging can ensure that only data goes into functions that have a same purpose tag as the input data. Therefore, data protection tags can impact how data is processed within the system. Other systems may use different tagging or indicator-based control, such as purpose-aware role-based access control. When data purpose tagging is used, the solution described herein can compare functions and data that have been pre-tagged to implement data protection. Therefore, additional tagging may not be required.

Figure 8:
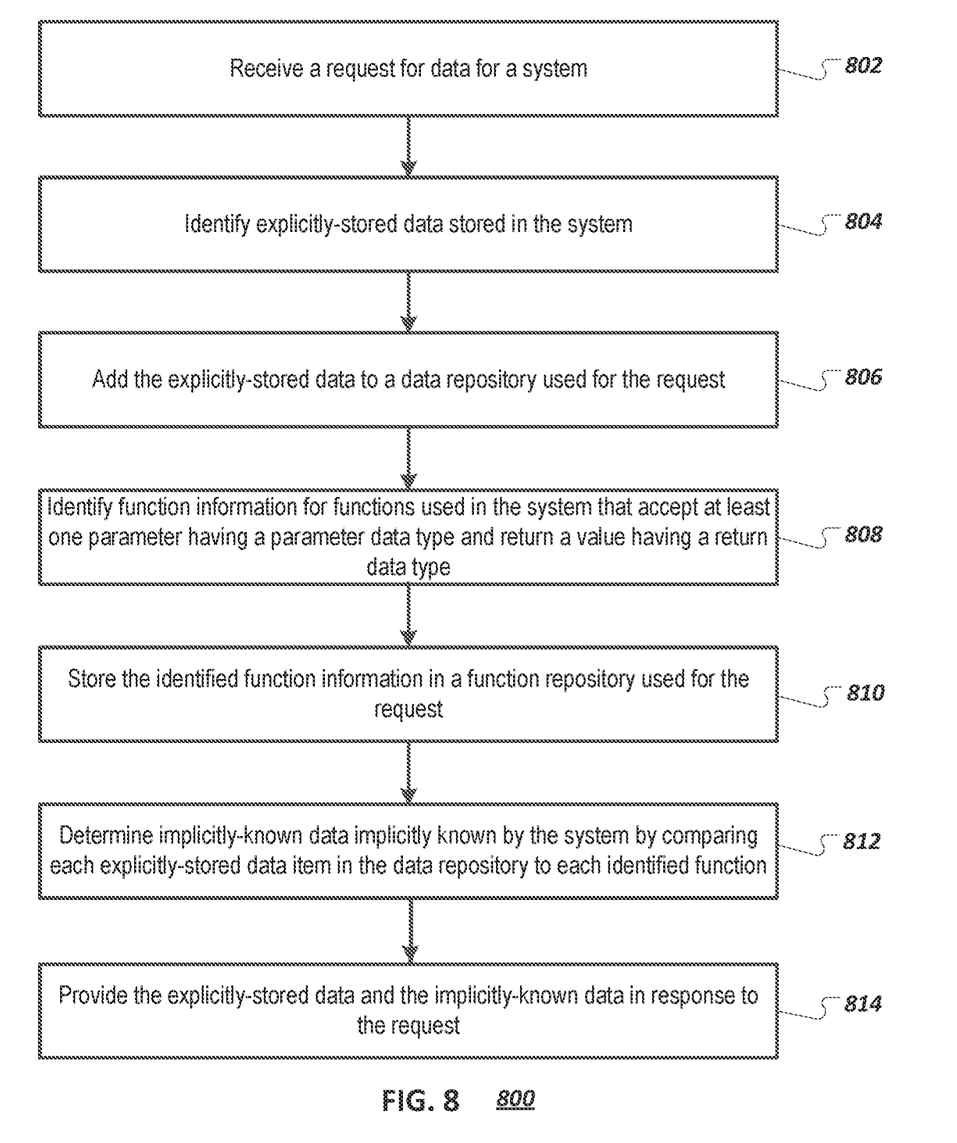
FIG. 8 is a flowchart of an example method for automatic generation of implicit information.

FIG. 8 is a flowchart of an example method for automatic generation of implicit information. It will be understood that method 800 and related methods may be performed, for example, by any suitable system, environment, software, and hardware, or a combination of systems, environments, software, and hardware, as appropriate. For example, one or more of a client, a server, or other computing device can be used to execute method 800 and related methods and obtain any data from the memory of a client, the server, or the other computing device. In some implementations, the method 800 and related methods are executed by one or more components of the system 100 described above with respect to FIG. 1. For example, the method 800 and related methods can be executed by the server 102 of FIG. 1.

At 802, a request for data for a system is received. The request can be for personal data for a data subject stored in or implicitly known by the system. An identity of the data subject can be verified before handling the request.

At 804, explicitly-stored data stored in the system related to the request is identified.

At 806, the explicitly-stored data is added to a data repository used for the request.

At 808, function information is identified for functions used in the system that accept at least one parameter having a parameter data type and return a return value having a return data type are identified from a function repository of the system.

At 810, the identified function information is stored in a function repository used for the request.

At 812, implicitly-known data implicitly known by the system is determined by comparing each explicitly-stored data item in the data repository to each identified function included in the function repository. For example, for a given combination of an explicitly-stored data item and a function, a determination can be made as to whether a data type of the explicitly-stored data item matches a data type of a parameter of the function. The data type of the explicitly-stored data item and the data type of the parameter of the function can be semantic data types. In response to determining that the data type of the explicitly-stored data item matches the data type of a parameter of the function, the function can be executed using the explicitly-stored data item as an input to the function to generate a function result, the function result can be identified as an implicitly-known data item, and the implicitly-known data item can be added to the data repository for the request.

Similar processing can be performed recursively. For example, each implicitly-known data item can be compared to each identified function and a determination can be made as to whether a data type of the implicitly-known data item matches a data type of a parameter of function. In response to determining that the data type of the implicitly-known data item matches the data of the parameter of the function, the function can be executed using the implicitly-known data item as a parameter value for the parameter to generate a function result, the function result can be identified as another second implicitly-known data item, and the other implicitly-known data item can be added to the data repository for the request.

At 814, the explicitly-stored data and the implicitly-known data is provided in response to the request. For example, the data repository for the request can include both the explicitly-stored data and the implicitly-known data and a copy of the data repository can be provided in response to the request. In some examples, the explicitly-stored data and the implicitly-known data can be provided to a reviewer before responding to the request. The reviewer may review and remove information from the data repository before the data repository is provided in response to the request, for example.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

Other variations and options are possible. For example, an explicitly-stored data item and a function can each have tags, and a determination whether a data item tag of the explicitly-stored data item matches a function tag of the function. The function can be executed using the explicitly-stored data item in response to determining that the data item tag matches the function tag and execution of the function using the explicitly-stored data item can be skipped in response to determining that the data item tag does not match the function tag.

As another example, for a function that includes multiple parameters, determining the implicitly-known data can include: comparing data types of the parameters to data types of different combinations of data items in the data repository; executing the function with a combination of data items as inputs in response to determining that data types of the combination of data items match data types of the multiple parameters; and identifying a function result of the function as an implicitly-known data item.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
   receiving a request for data for a system;
   identifying explicitly-stored data stored in the system;
   adding the explicitly-stored data to a data repository used for the request;
   identifying function information for functions used in the system that accept at least one parameter having a parameter data type and return a return value having a return data type;
   storing the identified function information in a function repository used for the request;
   determining implicitly-known data implicitly known by the system by comparing each explicitly-stored data item in the data repository to each identified function included in the function repository, wherein determining the implicitly-known data comprises, for a given combination of an explicitly-stored data item and a function, determining whether a data type of the explicitly-stored data item matches a data type of a parameter of the function; and
   providing the explicitly-stored data and the implicitly-known data in response to the request.

2. The computer-implemented method of claim 1, further comprising, in response to determining that the data type of the explicitly-stored data item matches the data type of a parameter of the function:
   executing the function using the explicitly-stored data item as an input to the function to generate a function result;
   identifying the function result as an implicitly-known data item; and
   adding the implicitly-known data item to the data repository for the request.

3. The computer-implemented method of claim 2, further comprising:
   comparing each implicitly-known data item to each identified function;
   determining whether a data type of a first implicitly-known data item matches a data type of a first parameter of a first function; and
   in response to determining that the data type of the first implicitly-known data item matches the data type of the first parameter of the first function:
      executing the first function using the implicitly-known data item as a parameter value for the first parameter to generate a first function result;
      identifying the first function result as a second implicitly-known data item; and
      adding the second implicitly-known data item to the data repository for the request.

4. The computer-implemented method of claim 1, wherein the data type of the explicitly-stored data item and the data type of the parameter of the function are semantic data types.

5. The-computer-implemented method of claim 1, wherein the explicitly-stored data item and the function each have tags, the method further comprising:
   determining whether a data item tag of a first explicitly-stored data item matches a function tag of a first function;
   executing the first function using the first explicitly-stored data item in response to determining that the data item tag matches the function tag; and
   skipping execution of the first function using the first explicitly-stored data item in response to determining that the data item tag does not match the function tag.

6. The computer-implemented method of claim 5, wherein the explicitly-stored data is personal data concerning a data subject, the data item tag of the first explicitly-stored data item indicates a first purpose for which the explicitly-stored data may be processed, the function tag of the first function also indicates the first purpose, and the first function is executed in response to determining that the data item tag and the function tag each indicate the first purpose.

7. The computer-implemented method of claim 1, wherein, fora function that includes multiple parameters, determining the implicitly-known data comprises:
comparing data types of the parameters to data types of different combinations of data items in the data repository;
executing the function with a combination of data items as inputs in response to determining that data types of the combination of data items match data types of the multiple parameters; and
identifying a function result of the function as an implicitly-known data item.

8. The computer-implemented method of claim 1, wherein the request is for personal data concerning a data subject, the identified explicitly-stored data is explicitly-stored personal data concerning the data subject, and the implicitly-known data is implicitly known personal data concerning the data subject.

9. The computer-implemented method of claim 8, further comprising verifying an identity of the data subject before handling the request.

10. The computer-implemented method of claim 1, further comprising providing the explicitly-stored data and the implicitly-known data to a reviewer before responding to the request.

11. The computer-implemented method of claim 1, wherein the explicitly-stored data and the implicitly-known data is used for testing of at least one of the functions in the function repository.

12. A system comprising:
one or more computers; and
a computer-readable medium coupled to the one or more computers having instructions stored thereon which, when executed by the one or more computers, cause the one or more computers to perform operations comprising:
receiving a request for data for a system;
identifying explicitly-stored data stored in the system;
adding the explicitly-stored data to a data repository used for the request;
identifying function information for functions used in the system that accept at least one parameter having a parameter data type and return a return value having a return data type;
storing the identified function information in a function repository used for the request;
determining implicitly-known data implicitly known by the system by comparing each explicitly-stored data item in the data repository to each identified function included in the function repository, wherein determining the implicitly-known data comprises, for a given combination of an explicitly-stored data item and a function, determining whether a data type of the explicitly-stored data item matches a data type of a parameter of the function; and
providing the explicitly-stored data and the implicitly-known data in response to the request.

13. The system of claim 12, wherein the operations further comprise, in response to determining that the data type of the explicitly-stored data item matches the data type of a parameter of the function:
executing the function using the explicitly-stored data item as an input to the function to generate a function result;
identifying the function result as an implicitly-known data item; and
adding the implicitly-known data item to the data repository for the request.

14. The system of claim 13, wherein the operations further comprise:
comparing each implicitly-known data item to each identified function;
determining whether a data type of a first implicitly-known data item matches a data type of a first parameter of a first function; and
in response to determining that the data type of the first implicitly-known data item matches the data type of the first parameter of the first function:
executing the first function using the implicitly-known data item as a parameter value for the first parameter to generate a first function result;
identifying the first function result as a second implicitly-known data item; and
adding the second implicitly-known data item to the data repository for the request.

15. A non-transitory, computer-readable medium coupled to one or more processors and having instructions stored thereon which, when executed by the one or more processors, cause the one or more processors to perform operations, the operations comprising:
receiving a request for data for a system;
identifying explicitly-stored data stored in the system;
adding the explicitly-stored data to a data repository used for the request;
identifying function information for functions used in the system that accept at least one parameter having a parameter data type and return a return value having a return data type;
storing the identified function information in a function repository used for the request;
determining implicitly-known data implicitly known by the system by comparing each explicitly-stored data item in the data repository to each identified function included in the function repository; and
providing the explicitly-stored data and the implicitly-known data in response to the request.

16. The computer-readable medium of claim 15, wherein determining the implicitly-known data comprises, for a given combination of an explicitly-stored data item and a function, determining whether a data type of the explicitly-stored data item matches a data type of a parameter of the function.

17. The computer-readable medium of claim 16, wherein the operations further comprise, in response to determining that the data type of the explicitly-stored data item matches the data type of a parameter of the function:
executing the function using the explicitly-stored data item as an input to the function to generate a function result;
identifying the function result as an implicitly-known data item; and
adding the implicitly-known data item to the data repository for the request.

18. The computer-readable medium of claim 17, wherein the operations further comprise:
comparing each implicitly-known data item to each identified function;

determining whether a data type of a first implicitly-known data item matches a data type of a first parameter of a first function; and in response to determining that the data type of the first implicitly-known data item matches the data type of the first parameter of the first function:
  executing the first function using the implicitly-known data item as a parameter value for the first parameter to generate a first function result;
  identifying the first function result as a second implicitly-known data item; and
  adding the second implicitly-known data item to the data repository for the request.

\* \* \* \* \*